Aug. 16, 1938.  W. LOCKHART  2,126,966
CLAMPING RING AND METHOD OF MAKING SAME
Filed Sept. 14, 1936   4 Sheets-Sheet 1
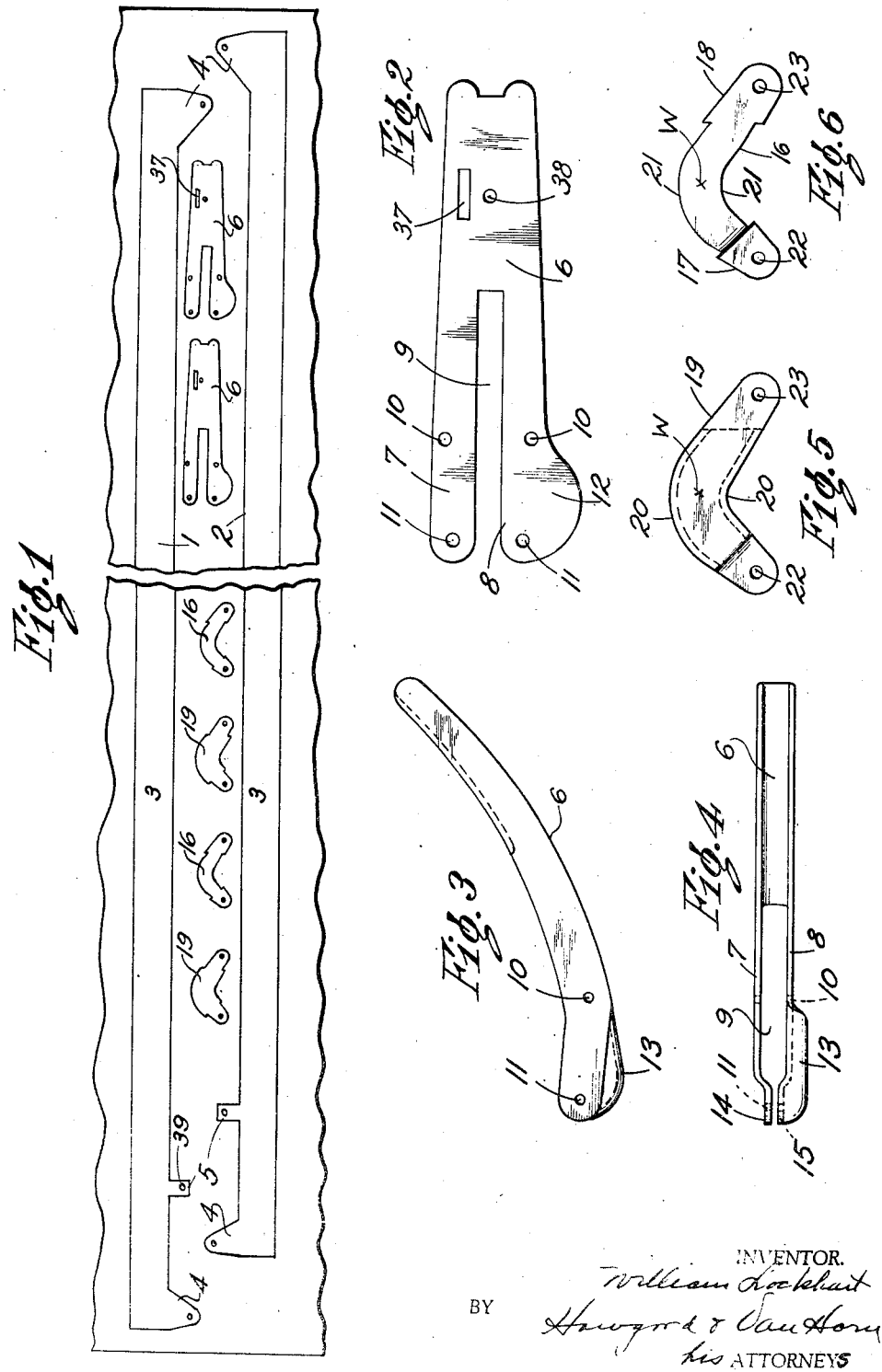
INVENTOR.
William Lockhart
BY Howard & Van Horn
his ATTORNEYS Aug. 16, 1938.   W. LOCKHART   2,126,966
CLAMPING RING AND METHOD OF MAKING SAME
Filed Sept. 14, 1936    4 Sheets-Sheet 2
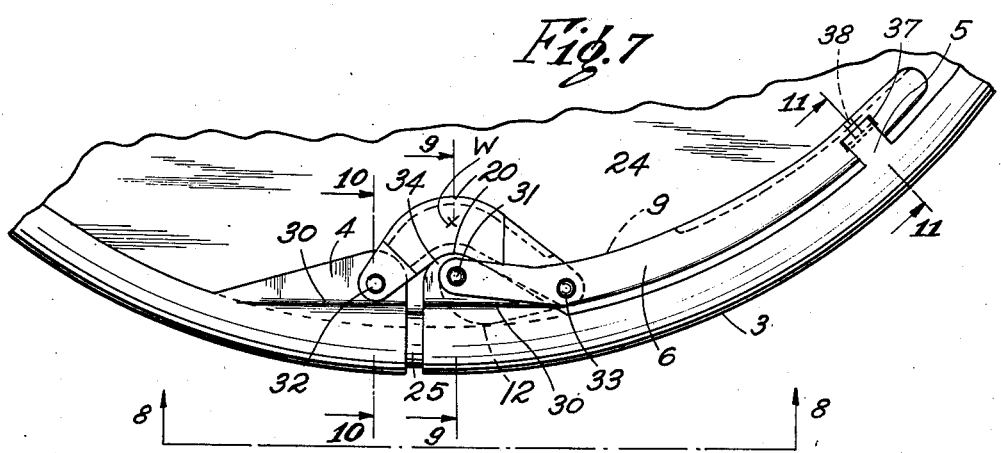
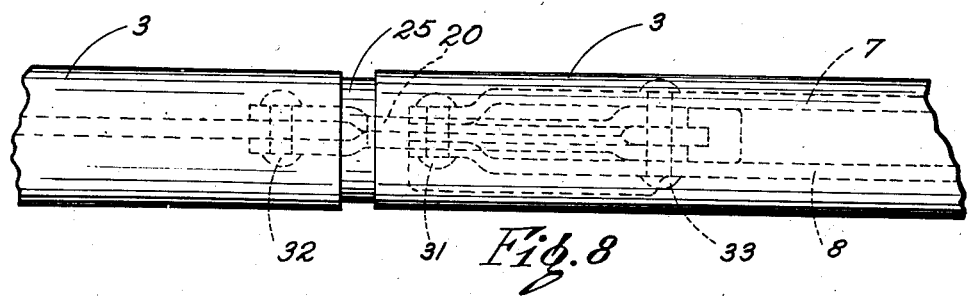
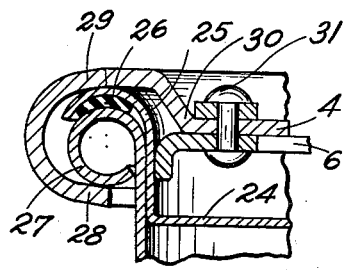
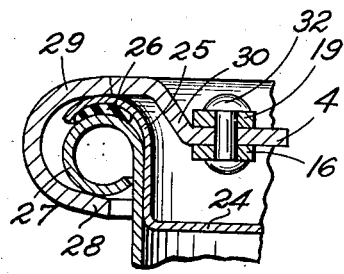
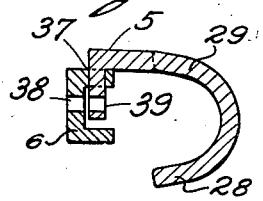
INVENTOR.
William Lockhart
BY Haugrod & Van Horn
His ATTORNEYS Aug. 16, 1938.  W. LOCKHART  2,126,966
CLAMPING RING AND METHOD OF MAKING SAME
Filed Sept. 14, 1936  4 Sheets-Sheet 3
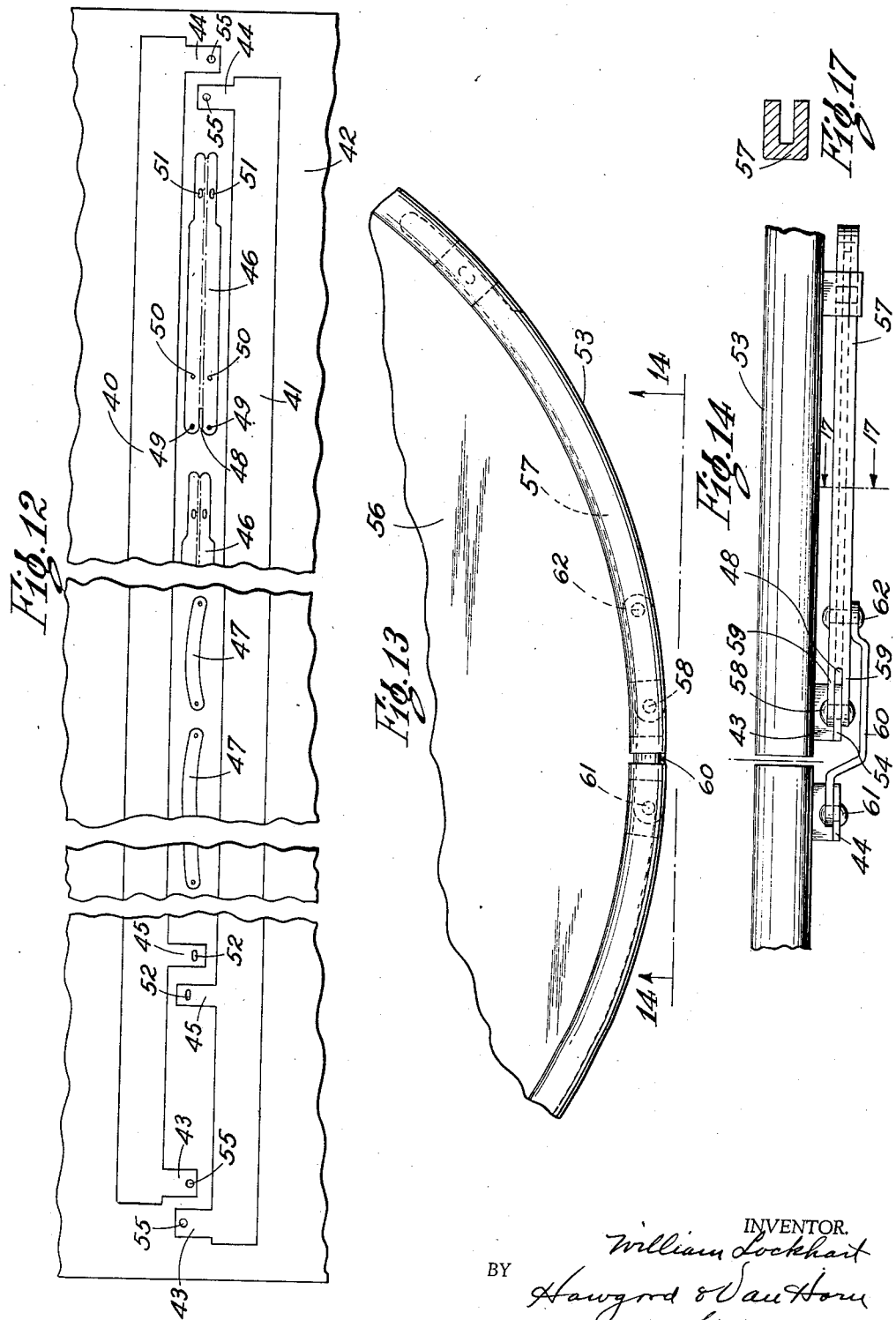
INVENTOR.
William Lockhart
BY Hawgood & Van Horn
his ATTORNEYS Aug. 16, 1938.     W. LOCKHART     2,123,966
CLAMPING RING AND METHOD OF MAKING SAME
Filed Sept. 14, 1936     4 Sheets-Sheet 4
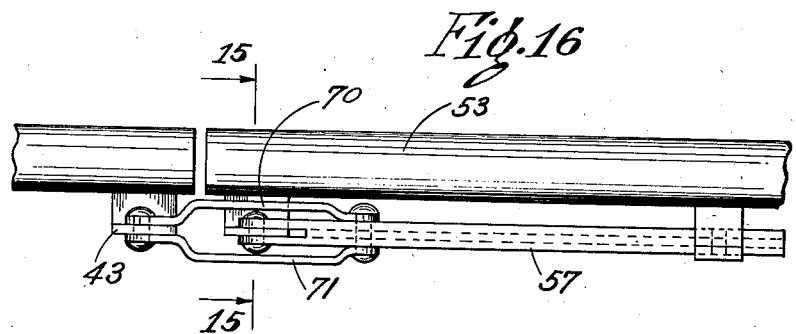
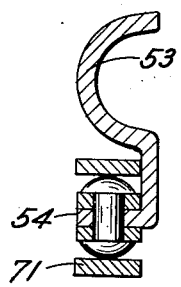
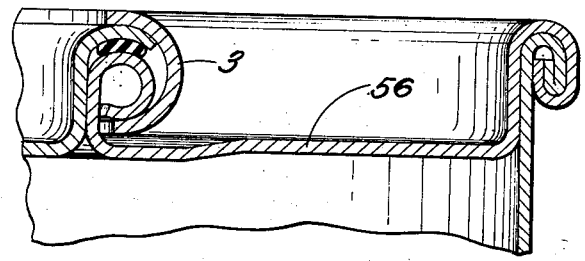
INVENTOR.
William Lockhart
BY
his ATTORNEYS Patented Aug. 16, 1938

2,126,966

UNITED STATES PATENT OFFICE 2,126,966

CLAMPING RING AND METHOD OF MAKING SAME

William Lockhart, Cleveland, Ohio, assignor to Cornell Securities Corporation, Cleveland, Ohio, a corporation of Delaware Application September 14, 1936, Serial No. 100,597

6 Claims. (Cl. 220—61)

My invention is an improvement in clamping rings for receptacles such as metallic drums, barrels, pails, or the like and more particularly relates to such rings having means for contracting the same and to the method or process of making the same.

Heretofore, it has been the custom to manufacture clamping rings having closing means of various types by separate blanking and forming operations, that is, the ring was formed and rolled from sheet strip, suitable end lugs were subsequently formed and attached by welding, and the closing and opening mechanism was formed by forging or stamping the handles and/or connecting means cooperating with the ends of the ring. Such methods involve many operations not only in forming, but in assembly, and necessarily result in high cost of manufacture.

By my present method I have eliminated some of the operations and objections in the manufacture of such rings with resultant saving of materials and reduction in costs.

It is one of the objects of my invention to simplify the manufacture and reduce the cost of making clamping rings and closing means therefor for metallic receptacles.

Another object of the invention is to form the ring and ring closing mechanism blanks from a single sheet or strip of material, preferably simultaneously with one another.

A further object is to provide a clamping ring for clamping a cover on a receptacle such as a drum, barrel, pail, or the like, and means for contracting the ring, by which the ends of the ring will be drawn inwardly simultaneously by exerting an outward pressure transversely of the ring and against the flange of the cover of the receptacle at points adjacent each of the ring ends.

Another object of the invention consists in forming a ring blank or sections thereof with the end lugs integral therewith.

A further object is a method of manufacture wherein a pair of spaced ring blanks may be struck from a sheet or strip of metal and whereby lever, link, or similar ring operating element blanks may be struck from that portion of the sheet or strip lying between the portions from which the ring blanks are struck.

Other objects and advantages of my invention will become more apparent as the following description of several embodiments thereof progresses, reference being made to the accompanying drawings in which like reference characters are employed to designate like parts throughout the same.

In the drawings:

Figure 1 is a view illustrating the method of forming unitary ring blanks of the inside closure type with integral lugs or projections, and of forming the actuating mechanism in accordance with this embodiment of my invention, Figure 2 is a plan view of a lever blank, Figure 3 is an elevation of the lever after it is formed, Figure 4 is another elevation of the same, Figure 5 is a plan view of one of the link blanks, Figure 6 is a plan view of a complementary link blank, Figure 7 is a fragmentary view of a ring of the inside closure type, showing the same assembled in use together with the associated actuating means, Figure 8 is an elevation of the device taken on line 8—8 of Figure 7, Figure 9 is a section taken on line 9—9 of Figure 7, Figure 10 is a section taken on line 10—10 of Figure 7, Figure 11 is a section taken on line 11—11 of Figure 7, Figure 12 is a view illustrating the method of forming unitary ring blanks of the outside closure type with integral lugs or projections, and of forming ring actuating mechanism, in accordance with a second embodiment of the invention, Figure 13 is a partial plan view of a device embodying the invention illustrated in Figure 12, Figure 14 is a slightly enlarged fragmentary view taken in the direction of line 14—14 of Figure 13, Figure 15 is a section taken on line 15—15 of Figure 16, Figure 16 is a view similar to that shown in Figure 14, showing an outside type of ring actuating means employing a pair of connecting links, Figure 17 is a section through the lever showing the channel cross-section and, Figure 18 illustrates the application of one of the devices to a receptacle having a partial open top as distinguished from the full open top.

I will describe first my improved method of manufacturing locking rings for clamping the covers on metallic receptacles, and the ring opening and closing mechanism therefor in accordance with the present invention.

The ring and operating mechanism may be formed simultaneously or successively by die stamping the same from a single sheet of metal of suitable thickness. The sheet may be in the form of a strip of sufficient width to permit stamping therefrom one or more pairs of ring blanks arranged in substantially parallel spaced relation, the space therebetween them being utilized in forming the blanks of the elements constituting the ring operating mechanism. In the particular form illustrated in the drawings, I have shown the ring operating mechanism as comprising a lever and a link which, when formed and assembled, cooperate with the ring ends to open and close the ring when the lever is operated about its pivot.

The ring blanks are indicated at 1 and 2 and each constitutes a flat band or body portion 3 of elongated form and formed at its ends with a lug portion 4 although, if desirable, the ring blanks may be formed in sections and butt welded endwise. Thus ring blanks of predetermined length may be built up from two end sections with integral lugs and one or more intermediate sections. Heretofore the lugs have been formed independently of the ring and were secured to the ring ends by welding the same to the ring ends after the ring was formed. By forming the lug portions 4 integral with the ring, I have by this invention eliminated two separate operations which were necessary heretofore, that is, the independent lug forming operation is avoided, and the step of welding the lugs to the ring ends is eliminated. This results in a considerable economy in manufacture and permits increased production at lower cost. The sealing tabs 5 are also simultaneously blanked out with the ring as indicated, thus avoiding a separate subsequent welding operation at this point.

Thus it will be seen that by my invention, a one piece ring blank may be formed in a single die stamping operation. The blank when thus stamped out, is then subjected to a rolling and forming operation to impart a circular form to the ring having a channeled cross-section.

My improved method further contemplates the forming of the ring operating mechanism, which in the present illustration is shown as including a link and lever mechanism, from the material of the sheet lying between adjacent ring blanks.

In Figure 1, I have shown how two lever blanks and two pairs of link sections may be so formed. In this manner, I aim to utilize a large portion of the sheet lying between the ring blanks 1 and 2 and thus to reduce to a minimum the amount of scrap.

Referring now more particularly to Figures 2 to 4 inclusive, I will describe the illustrated form of lever and blank. In Figure 2 the lever blank consists of a body 6 die stamped from flat metal sheet.

The blank is adapted to be formed into channel cross-section by bending the side portions 7 and 8 forming the bifurcated end at 9 downwardly so that the respective openings 10 and 11 will be in alignment as shown in Figures 3 and 4. The lever when thus formed is of arcuate shape as shown in Figure 3 to lie within the circumference of the ring. Integrally formed on the side portion 8 of the lever blank is a cam member 12 which in use is adapted to engage the flange of the receptacle cover to exert a lateral pressure thereagainst when the ring is contracted. The outer edge of the cam member 12 is formed as a bearing flange 13 by bending the metal over and outwardly of the lever body. It will be noted the lever thus formed constitutes a pair of spaced arms 7 and 8, the outer ends 14 and 15 respectively being bent toward each other as indicated in Figure 4 to receive one of the lugs 4 of the ring in pivotal relation.

In Figures 5 and 6, I have illustrated a composite link structure which includes a flat member 16 which is substantially arcuate in plan view. The member 16 which constitutes the lower link section is provided with edge flanges 17 and 18 adjacent its ends. The upper link section 19 is also formed from a flat sheet as a blank and is similar in general shape to the lower section 16 and is adapted to overlie the same when the link is assembled. One end of the respective link section may be spaced as shown in Figure 8 to receive the lug 4 to which it is pivotally connected, while the intermediate portion of the link sections may be spot welded as at W. The section 19 is formed with downwardly extending flanges which lie along the edges 21 of the lower section 16 to provide a finished outer and inner wall, the inner wall constituting a bearing surface. The ends of the composite link are apertured at 22 and 23 as indicated for pivotal connection with one of the lugs 4 and with the lever at 10 respectively.

In Figures 7 to 11 inclusive I have illustrated an embodiment of my invention applied in use as an improved article of manufacture.

The improved locking ring and operating mechanism is particularly useful in clamping full removable covers on metallic receptacles such as barrels, drums, pails, or the like, and may be used with such receptacles either of the full open head type where the opening in the end of the barrel is coextensive with the inside diameter of the barrel, or with the receptacles of the partial open head type. In the latter class the filling and discharging opening is of a smaller diameter than the inside diameter of the receptacle and the removable closure seats within the restricted opening in the head.

In either case, however, it is the usual practice to employ a cover 24 having an upwardly and outwardly extending annular flange 25 which rests upon a packing 26 on the bead 27 formed on the neck defining the receptacle opening. The ring 3 being of channel cross-section has portions 28 and 29 which engage the bead and the cover flange to press the same toward each other when the ring is contracted. The lugs 4 formed integrally with the ring ends as hereinbefore described, extend inwardly toward the axis of the ring and in order to maintain the ring operating mechanism below the upper plane of the ring and within the cover, the lugs 4 may be bent downwardly and inwardly as indicated at 30.

Referring now more particularly to the ring opening and closing means which forms part of the present invention, I provide a lever of the type shown in Figures 2 to 4, which is pivotally connected at one end with one of the lugs 4 by means of a pin or the like 31. The lug 4 lies between the portions 7 and 8 of the lever and the clearance 9 is of sufficient length to permit a full swing of the lever from the position shown in Figure 7 to its opposite position without interference with the link 20 operating in this clearance.

One end of the link is pivotally connected with the opposite lug 4 by means of a pin 32 while the opposite end of the link is pivotally connected with the lever 6 by means of a pin 33.

In this invention the form of link employed is such that its inner intermediate portion or side wall or flange 20 provides a curved bearing surface for the protruding part 34 of the lug 4 to which the lever 6 is pivoted, and as the lever is moved toward the closed position as in Figure 7 the bearing surface of the link will slide along the curved bearing surface of the said lug. Since the direction of movement of the link as illustrated is clockwise and toward the adjacent ring end, there will be created an inward pull on the opposite ring end through the link and pin 32. At the same time movement of the lever toward its closed position will exert an outward lateral pressure against the cover flange through the cam 12. This outward pressure against the cover flange has the advantage of drawing this end of the ring inwardly also, and of exerting additional inward pressure through the right hand lug and against the link 20 to increase the inward pulling effect through the link and pin 32 on the opposite lug 4. Thus it will be seen that in closing the lever to contract the ring, forces will be applied simultaneously to press the cover tight upon the packing and receptacle bead to provide a fluid tight seal therebetween, and to draw both ends of the ring opposite the lugs 4 inwardly to insure a proper sealing of the ring at its ends. Thus the fluid tight seal is provided throughout the entire circumference of the opening in the receptacle.

Furthermore, the composite link formed of two sections having portions spaced one from the other, and the channel form lever, add considerable strength and rigidity to these parts, thus eliminating the necessity for forged parts or other expensive construction.

The ring is provided with a sealing lug 5 formed integral therewith and which is bent at its free end to be inserted in an opening 37 in the lever body 6. A perforation 38 may also be provided for a sealing wire, there being a similar opening 39 formed in the lug 5 to register with the opening 38.

In Figures 12 to 18 inclusive I have illustrated another embodiment of my invention which is similar in many respects to the form just described, but differs in that the completed ring and closing mechanism is of the type in which the closing mechanism is located and operates outside the cover and receptacle.

As illustrated in Figure 12 the spaced ring blanks 40 and 41 are die stamped from a single sheet or strip of metal 42, each as a complete ring blank or unit comprising an elongated flat body portion 40 or 41 having outwardly extending lugs 43 and 44 formed integral therewith adjacent the respective ends of the ring blanks. Projections 45 are also formed integral with the blanks and extend in the same direction as the lugs 43 and 44. The projections 45 provide means for receiving the lever handle as will be pointed out hereinafter.

The metal between the ring blanks 40 and 41 is utilized in forming the ring operating mechanism, which in the present illustration may comprise an actuating lever 46 and one or more links 47 or members arranged for connecting the ends of the clamping ring after it is completely formed.

The lever blanks comprise a body portion 46 of flat elongated form which is adapted to be formed into channel cross-section as shown in Figure 17 by bending the blank longitudinally along a medial line, although the overlying sections of the body may be pressed tightly together longitudinally except those portions adjacent one end where the lever is pivotally connected with one of the ring lugs.

One end of each lever blank is bifurcated as at 48 to permit this end of the lever to pivotally receive and operate on one of the lugs.

Openings 49 and 50 are punched in the blanks for pivotally connecting the lever with one of the lugs and with an end of the links 47 respectively.

Elongated openings 51 may also be provided in the blank near its opposite end for register with an opening 52 formed in the projection to receive a sealing wire or the like when the assembled ring is in use.

The link blanks 47 are preferably arcuate in shape so as to conform to the approximate curvature of the outside wall of the drum when in use.

After the flat ring blanks are formed, they are rolled into substantial circular form, and are formed into channel cross-section as at 53 (Figure 15), the lugs 43 and 44 depending therefrom near the ring ends and bent outwardly to form a supporting flange 54 for the lever end. Each lug is apertured as at 55. It will be noted the flange 54 lies below the channeled body of the ring and within the outer circumference thereof. In this manner the actuating mechanism is conveniently nested close to the receptacle and below the ring and bead when the ring is contracted to clamp the cover in place. Thus the actuating means offers no interference with objects placed close to the receptacle and does not interfere with rolling the receptacle along a surface.

In Figure 13 I have shown in use a one-piece ring of the outside closing type made in accordance with the present invention. The receptacle cover is indicated at 56 and is applied to the receptacle in a manner similar to that shown in Figures 7 to 10.

The ring 53 engages the cover flange 25 and the bead 27 and tends to press them together when the ring is contracted, thus sealing the cover in place.

A lever 57 is pivotally connected near one end with the lug 43 as at 58, the spaced apart ends 59 lying on opposite sides of the lug flange 54.

As shown in Figure 14, I may employ but one link 60 formed from a blank 47, for pivotally connecting the other lug 44 at 61 with another portion of the lever 57 as at 62. The ends of the link are therefore bent to lie flat against the lug 44 and the under surface of the channeled lever 57, the intermediate portion of the link lying in a plane such as will afford clearance with respect to pin 58 when the lever is operated.

In Figure 16, I have shown an assembly which is substantially identical with that shown in Figures 13 and 14 except that a pair of links 70 and 71 are used to pivotally connect the lever 57 with the lug 43. In this arrangement the links lie on opposite sides of the plane of the lever and afford additional strength to the general structure. Such devices are desirable when applied to containers of heavy gauge metal such as large shipping drums.

Another use for the invention is illustrated in Figure 18. In this view the device is shown applied to a barrel, drum, or pail having a partial opening for filling or discharging, that is, the opening in the head is less than the inside diameter of the receptacle.

I may use forms of my invention as illustrated in Figures 7, 14, 16, and 17 equally satisfactorily with a container having either a full opening or a partial opening, and I wish it to be understood that I hereby intend the same shall be applicable to all such forms shown in the drawings.

Various changes may be made in the details of construction and arrangement of parts without departing from the spirit of the invention or the scope of the appended claims.

I claim:

1. In a device for clamping a cover on a receptacle, a split contractible clamping ring having portions engageable with the cover and receptacle to press the same together in sealed relation when the ring is contracted, and means for contracting and expanding the ring including an actuating lever pivotally connected with one end of the ring and a connecting member pivotally connected with the other end of the ring and with said lever, said connecting member comprising a link of substantially arcuate form and having a portion intermediate its ends providing a bearing surface for sliding engagement with and in a plane of one of said ring ends.

2. In a device for clamping a cover on a receptacle, a split contractible clamping ring having portions engageable with the cover and receptacle to press the same together in sealed relation when the ring is contracted, lugs carried by the ring ends defining the split and means for contracting and expanding the ring including an actuating lever pivotally connected with one of said lugs, and a substantially L-shaped link pivotally connected with the other lug and with said lever, the intermediate portion of the link having a sliding bearing engagement with and in a plane of said first named lug when the lever is actuated to contract the ring.

3. In a device for clamping a cover on a receptacle, a split contractible clamping ring having portions engageable with the cover and receptacle to press the same together in sealed relation when the ring is contracted, lugs formed integral with the ring ends defining the split and means for contracting and expanding the ring including an actuating lever pivotally connected with one of said lugs, and a substantially L-shaped link pivotally connected with the other lug and with said lever, the intermediate portion of the link having a sliding bearing engagement with and in a plane of said first named lug when the lever is actuated to contract the ring.

4. In a device for clamping a cover on a receptacle, a split contractible clamping ring having portions engageable with the cover and receptacle to press the same together in sealed relation when the ring is contracted, lugs carried by the ring ends defining the split and means for contracting and expanding the ring including an actuating lever pivotally connected with one of said lugs, and a substantially L-shaped link pivotally connected with the other lug and with said lever, the intermediate portion of the link having a sliding bearing engagement with and in a plane of said first named lug when the lever is actuated to contract the ring, said lever having a bearing member formed thereon for engagement with the cover to exert an outward pressure thereagainst simultaneously with engagement of the link with the said first lug when the lever is actuated to contract the ring, to thereby pull the ring ends radially inwardly of the receptacle.

5. In a device for clamping a cover on a receptacle, a split contractible clamping ring having portions engageable with the cover and receptacle to press the same together in sealed relation when the ring is contracted, and means for contracting and expanding the ring including an actuating lever pivotally connected with one end of the ring and a link pivotally connected with the other end of the ring and with said lever, said link comprising a member having an intermediate portion of arcuate form for bearing engagement with and in a plane of one of the said ring ends, said lever having a portion engageable with a portion of the cover to exert an outward lateral pressure thereagainst, whereby upon moving the lever to ring contracting position the ring will be contracted and the extreme end portions thereof will be pulled inwardly radially of the receptacle in close sealing relation.

6. In a device for clamping a cover on a receptacle, a split contractible clamping ring having portions engageable with the cover and receptacle to press the same together in sealed relation when the ring is contracted, lugs formed on the ring ends defining the split, and means for contracting and expanding the ring including an actuating lever pivotally connected with one of said lugs, and a member pivotally connecting said lever with said other lug, the intermediate portion of said connecting member having bearing engagement with and in a plane of said first named lug when the lever is actuated to contract the ring.

WILLIAM LOCKHART.